(12) United States Patent
Khatutsky

(10) Patent No.: US 9,189,361 B2
(45) Date of Patent: Nov. 17, 2015

(54) PROACTIVE PERFORMANCE MANAGEMENT FOR MULTI-USER ENTERPRISE SOFTWARE SYSTEMS

(75) Inventor: Victor E. Khatutsky, Belmont, MA (US)

(73) Assignee: Pegasystems Inc., Cambridge, MA (US)

(*) Notice: Subject to any disclaimer, the term of this patent is extended or adjusted under 35 U.S.C. 154(b) by 0 days.

(21) Appl. No.: 13/536,079

(22) Filed: Jun. 28, 2012

(65) Prior Publication Data
US 2013/0007267 A1   Jan. 3, 2013

Related U.S. Application Data

(63) Continuation of application No. 11/681,269, filed on Mar. 2, 2007, now Pat. No. 8,250,525.

(51) Int. Cl.
| | | |
|---|---|---|
| G06F 9/44 | (2006.01) | |
| G06F 9/45 | (2006.01) | |
| G06F 11/34 | (2006.01) | |

(52) U.S. Cl.
CPC ........ *G06F 11/3409* (2013.01); *G06F 11/3438* (2013.01); *G06F 11/3442* (2013.01); *G06F 11/3447* (2013.01); *G06F 2201/81* (2013.01); *G06F 2201/86* (2013.01)

(58) Field of Classification Search
None
See application file for complete search history.

(56) References Cited

U.S. PATENT DOCUMENTS

| | | |
|---|---|---|
| 4,047,059 A | 9/1977 | Rosenthal |
| 4,344,142 A | 8/1982 | Diehr, II et al. |
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,062,060 A | 10/1991 | Kolnick |
| 5,077,491 A | 12/1991 | Heck et al. |

(Continued)

FOREIGN PATENT DOCUMENTS

| | | |
|---|---|---|
| DE | 19911098 A1 | 12/1999 |
| EP | 0 549 208 A2 | 6/1993 |

(Continued)

OTHER PUBLICATIONS

[No Author Listed] FreeBSD Project. "EDQUOTA(8)" in Free BSD System Manager's Manual. FreeBSD 8.2 Jun. 6, 1993. pp. 1-2. Retrieved from freebsd.org on Oct. 27, 2011.

(Continued)

*Primary Examiner* — Don Wong
*Assistant Examiner* — Erika Kretzmer
(74) *Attorney, Agent, or Firm* — Nutter McClennen & Fish LLP

(57) ABSTRACT

The invention provides, in some aspects, systems for proactive management of development and performance of a software application based on monitoring it (and/or one or more of its components) during the course of development or execution. Those systems signal alerts upon determining that actual or expected usage of the application (or its components) by users of like classes (or roles) is anticipated to, or does, exceed quotas, when the application is placed in production mode.

20 Claims, 3 Drawing Sheets

(56) References Cited

U.S. PATENT DOCUMENTS

| | | |
|---|---|---|
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt et al. |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durflinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,678,039 A | 10/1997 | Hinks et al. |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,832,483 A | 11/1998 | Barker |
| 5,841,673 A | 11/1998 | Kobayashi et al. |
| 5,873,096 A | 2/1999 | Lim et al. |
| 5,875,334 A | 2/1999 | Chow et al. |
| 5,875,441 A | 2/1999 | Nakatsuyama et al. |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,907,490 A | 5/1999 | Oliver |
| 5,907,837 A | 5/1999 | Ferrel et al. |
| 5,910,748 A | 6/1999 | Reffay et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,098,172 A | 8/2000 | Coss et al. |
| 6,105,035 A | 8/2000 | Monge et al. |
| 6,122,632 A | 9/2000 | Botts et al. |
| 6,125,363 A | 9/2000 | Buzzeo et al. |
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,300,947 B1 | 10/2001 | Kanevsky |
| 6,308,163 B1 | 10/2001 | Du et al. |
| 6,314,415 B1 | 11/2001 | Mukherjee |
| 6,324,693 B1 | 11/2001 | Brodersen et al. |
| 6,330,554 B1 | 12/2001 | Altschuler et al. |

(56) References Cited

U.S. PATENT DOCUMENTS

| | | |
|---|---|---|
| 6,338,074 B1 | 1/2002 | Poindexter et al. |
| 6,341,277 B1 | 1/2002 | Coden et al. |
| 6,341,293 B1 | 1/2002 | Hennessey |
| 6,349,238 B1 | 2/2002 | Gabbita et al. |
| 6,351,734 B1 | 2/2002 | Lautzenheiser et al. |
| 6,359,633 B1 | 3/2002 | Balasubramaniam et al. |
| 6,369,819 B1 | 4/2002 | Pitkow et al. |
| 6,380,910 B1 | 4/2002 | Moustakas et al. |
| 6,381,738 B1 | 4/2002 | Choi et al. |
| 6,389,460 B1 | 5/2002 | Stewart et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,426,723 B1 | 7/2002 | Smith et al. |
| 6,429,870 B1 | 8/2002 | Chen et al. |
| 6,437,799 B1 | 8/2002 | Shinomi et al. |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,463,440 B1 | 10/2002 | Hind et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,899 B1 | 3/2003 | Kraft et al. |
| 6,530,079 B1 | 3/2003 | Choi et al. |
| 6,539,374 B2 | 3/2003 | Jung |
| 6,542,912 B2 | 4/2003 | Meltzer et al. |
| 6,546,406 B1 | 4/2003 | DeRose et al. |
| 6,549,904 B1 | 4/2003 | Ortega et al. |
| 6,556,983 B1 | 4/2003 | Altschuler et al. |
| 6,556,985 B1 | 4/2003 | Karch |
| 6,560,592 B1 | 5/2003 | Reid et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudharakan et al. |
| 6,643,638 B1 | 11/2003 | Xu |
| 6,643,652 B2 | 11/2003 | Helgeson et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,691,067 B1 * | 2/2004 | Ding et al. .................. 702/186 |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshavsky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Stephen Chen et al. |
| RE38,633 E | 10/2004 | Srinivasan |
| 6,804,330 B1 | 10/2004 | Jones et al. |
| 6,810,429 B1 | 10/2004 | Walsh et al. |
| 6,820,082 B1 | 11/2004 | Cook et al. |
| 6,829,655 B1 | 12/2004 | Huang et al. |
| 6,831,668 B2 | 12/2004 | Cras et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,566 B2 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B2 | 10/2005 | Baker et al. |
| 6,959,432 B2 | 10/2005 | Crocker |
| 6,961,725 B2 | 11/2005 | Yuan et al. |
| 6,965,889 B2 | 11/2005 | Serrano-Morales et al. |
| 6,976,144 B1 | 12/2005 | Trefler et al. |
| 6,985,912 B2 | 1/2006 | Mullins et al. |
| 7,020,869 B2 | 3/2006 | Abrari et al. |
| 7,028,225 B2 | 4/2006 | Maso et al. |
| 7,031,901 B2 | 4/2006 | Abu El Ata |
| 7,058,367 B1 | 6/2006 | Luo et al. |
| 7,058,637 B2 | 6/2006 | Britton et al. |
| 7,064,766 B2 | 6/2006 | Beda et al. |
| 7,073,177 B2 * | 7/2006 | Foote et al. .................. 718/104 |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,353,229 B2 | 4/2008 | Vilcauskas, Jr. et al. |
| 7,406,475 B2 | 7/2008 | Dorne et al. |
| 7,412,388 B2 | 8/2008 | Dalal et al. |
| 7,505,827 B1 | 3/2009 | Boddy et al. |
| 7,536,294 B1 | 5/2009 | Stanz et al. |
| 7,555,645 B2 | 6/2009 | Vissapragada |
| 7,574,494 B1 | 8/2009 | Mayernick et al. |
| 7,596,504 B2 | 9/2009 | Hughes et al. |
| 7,640,222 B2 | 12/2009 | Trefler |
| 7,665,063 B1 | 2/2010 | Hofmann et al. |
| 7,711,919 B2 | 5/2010 | Trefler et al. |
| 7,779,395 B1 | 8/2010 | Chotin et al. |

(56) References Cited

U.S. PATENT DOCUMENTS

| | | |
|---|---|---|
| 7,844,594 B1 | 11/2010 | Holt et al. |
| 7,870,244 B2 * | 1/2011 | Chong et al. ................ 709/224 |
| 7,937,690 B2 * | 5/2011 | Casey ........................ 717/128 |
| 7,983,895 B2 | 7/2011 | McEntee et al. |
| 8,037,329 B2 | 10/2011 | Leech et al. |
| 8,073,802 B2 | 12/2011 | Trefler |
| 8,250,525 B2 | 8/2012 | Khatutsky |
| 8,335,704 B2 | 12/2012 | Trefler et al. |
| 8,479,157 B2 | 7/2013 | Trefler et al. |
| 8,880,487 B1 | 11/2014 | Clinton et al. |
| 8,924,335 B1 | 12/2014 | Trefler et al. |
| 8,959,480 B2 | 2/2015 | Trefler et al. |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0073337 A1 | 6/2002 | Ioele et al. |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0184610 A1 | 12/2002 | Chong et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Schuetze et al. |
| 2003/0084401 A1 | 5/2003 | Abel et al. |
| 2003/0109951 A1 | 6/2003 | Hsiung et al. |
| 2003/0135358 A1 | 7/2003 | Lissauer et al. |
| 2003/0154380 A1 * | 8/2003 | Richmond et al. ............ 713/182 |
| 2003/0191626 A1 | 10/2003 | Al-Onaizan et al. |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0024603 A1 | 2/2004 | Mahoney et al. |
| 2004/0034651 A1 | 2/2004 | Gupta et al. |
| 2004/0049479 A1 | 3/2004 | Dorne et al. |
| 2004/0049509 A1 | 3/2004 | Keller et al. |
| 2004/0054610 A1 | 3/2004 | Amstutz et al. |
| 2004/0064552 A1 * | 4/2004 | Chong et al. ................ 709/224 |
| 2004/0088199 A1 | 5/2004 | Childress et al. |
| 2004/0103014 A1 | 5/2004 | Teegan et al. |
| 2004/0117759 A1 | 6/2004 | Rippert et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0145607 A1 | 7/2004 | Alderson |
| 2004/0148138 A1 * | 7/2004 | Garnett et al. ................ 702/189 |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0104628 A1 | 5/2005 | Tanzawa et al. |
| 2005/0125683 A1 | 6/2005 | Matsuyama et al. |
| 2005/0138162 A1 * | 6/2005 | Byrnes ........................ 709/223 |
| 2005/0165823 A1 | 7/2005 | Ondrusek et al. |
| 2005/0216235 A1 | 9/2005 | Butt et al. |
| 2005/0228875 A1 * | 10/2005 | Monitzer et al. ............... 709/221 |
| 2005/0234882 A1 | 10/2005 | Bennett et al. |
| 2005/0288920 A1 | 12/2005 | Green et al. |
| 2006/0004845 A1 | 1/2006 | Kristiansen et al. |
| 2006/0020783 A1 | 1/2006 | Fisher |
| 2006/0041861 A1 | 2/2006 | Trefler et al. |
| 2006/0063138 A1 | 3/2006 | Loff et al. |
| 2006/0064486 A1 | 3/2006 | Baron et al. |
| 2006/0080082 A1 | 4/2006 | Ravindra et al. |
| 2006/0100847 A1 | 5/2006 | McEntee et al. |
| 2006/0139312 A1 | 6/2006 | Sinclair et al. |
| 2006/0149751 A1 | 7/2006 | Jade et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0218166 A1 | 9/2006 | Myers et al. |
| 2006/0271920 A1 | 11/2006 | Abouelsaadat |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0118497 A1 | 5/2007 | Katoh |
| 2007/0130130 A1 | 6/2007 | Chan et al. |
| 2007/0136068 A1 | 6/2007 | Horvitz |
| 2007/0143851 A1 * | 6/2007 | Nicodemus et al. ............ 726/25 |
| 2007/0203756 A1 | 8/2007 | Sears et al. |
| 2007/0208553 A1 | 9/2007 | Hastings et al. |
| 2007/0233902 A1 | 10/2007 | Trefler et al. |
| 2007/0239646 A1 | 10/2007 | Trefler |
| 2007/0260584 A1 | 11/2007 | Marti et al. |
| 2007/0294644 A1 | 12/2007 | Yost |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0184230 A1 * | 7/2008 | Leech et al. ................ 718/100 |
| 2008/0195377 A1 | 8/2008 | Kato et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2009/0075634 A1 | 3/2009 | Sinclair et al. |
| 2009/0132232 A1 | 5/2009 | Trefler |
| 2009/0158407 A1 | 6/2009 | Nicodemus et al. |
| 2009/0164494 A1 | 6/2009 | Dodin |
| 2009/0171938 A1 | 7/2009 | Levin et al. |
| 2009/0276206 A1 | 11/2009 | Fitzpatrick et al. |
| 2010/0088266 A1 | 4/2010 | Trefler |
| 2010/0107137 A1 | 4/2010 | Trefler et al. |
| 2010/0217737 A1 | 8/2010 | Shama |
| 2012/0041921 A1 | 2/2012 | Canaday et al. |
| 2013/0231970 A1 | 9/2013 | Trefler et al. |

(56) References Cited

U.S. PATENT DOCUMENTS

| | | | |
|---|---|---|---|
| 2013/0254833 A1* | 9/2013 | Nicodemus et al. ............ 726/1 |
| 2014/0019400 A1 | 1/2014 | Trefler et al. | |

FOREIGN PATENT DOCUMENTS

| | | |
|---|---|---|
| EP | 0 669 717 A1 | 8/1995 |
| EP | 0 996 916 A1 | 5/2000 |
| EP | 1 015 997 A2 | 7/2000 |
| EP | 1 019 807 A2 | 7/2000 |
| EP | 1 073 955 A1 | 2/2001 |
| EP | 1 073 992 A1 | 2/2001 |
| EP | 1 135 723 A1 | 9/2001 |
| EP | 1 163 604 A2 | 12/2001 |
| EP | 1 183 636 A1 | 3/2002 |
| EP | 1 196 882 A1 | 4/2002 |
| EP | 1 203 310 A1 | 5/2002 |
| EP | 1 208 482 A1 | 5/2002 |
| EP | 1 212 668 A2 | 6/2002 |
| EP | 1 240 592 A1 | 9/2002 |
| EP | 1 277 102 A2 | 1/2003 |
| EP | 1 277 119 A1 | 1/2003 |
| EP | 1 277 120 A1 | 1/2003 |
| EP | 1 277 153 A1 | 1/2003 |
| EP | 1 277 155 A1 | 1/2003 |
| EP | 1 277 329 A1 | 1/2003 |
| EP | 1 374 083 A1 | 1/2004 |
| EP | 1 382 030 A2 | 1/2004 |
| EP | 1 386 241 A1 | 2/2004 |
| EP | 1 393 172 A2 | 3/2004 |
| EP | 1 393 188 A1 | 3/2004 |
| EP | 1 402 336 A2 | 3/2004 |
| EP | 1 407 384 A1 | 4/2004 |
| EP | 1 430 396 A1 | 6/2004 |
| EP | 1 438 649 A1 | 7/2004 |
| EP | 1 438 654 A1 | 7/2004 |
| EP | 1 438 672 A1 | 7/2004 |
| EP | 1 483 685 A1 | 12/2004 |
| EP | 1 490 747 A1 | 12/2004 |
| EP | 1 490 809 A1 | 12/2004 |
| EP | 1 492 232 A1 | 12/2004 |
| EP | 1 782 183 A2 | 5/2007 |
| EP | 1 830 312 A1 | 9/2007 |
| EP | 1 840 803 A1 | 10/2007 |
| EP | 2 115 581 A1 | 11/2009 |
| WO | 98/38564 A2 | 9/1998 |
| WO | 98/40807 A2 | 9/1998 |
| WO | 99/05632 A1 | 2/1999 |
| WO | 99/45465 A1 | 9/1999 |
| WO | 99/50784 A1 | 10/1999 |
| WO | 00/33187 A1 | 6/2000 |
| WO | 00/33217 A1 | 6/2000 |
| WO | 00/33226 A1 | 6/2000 |
| WO | 00/33235 A1 | 6/2000 |
| WO | 00/33238 A2 | 6/2000 |
| WO | 00/52553 A2 | 9/2000 |
| WO | 00/52603 A1 | 9/2000 |
| WO | 01/79994 A2 | 1/2001 |
| WO | 01/40958 A1 | 6/2001 |
| WO | 01/75610 A1 | 10/2001 |
| WO | 01/75614 A1 | 10/2001 |
| WO | 01/75747 A1 | 10/2001 |
| WO | 01/75748 A1 | 10/2001 |
| WO | 01/76206 A1 | 10/2001 |
| WO | 01/77787 A2 | 10/2001 |
| WO | 02/21254 A2 | 3/2002 |
| WO | 02/44947 A2 | 6/2002 |
| WO | 02/056249 A2 | 7/2002 |
| WO | 02/080006 A1 | 10/2002 |
| WO | 02/080015 A1 | 10/2002 |
| WO | 02/082300 A1 | 10/2002 |
| WO | 02/084925 A2 | 10/2002 |
| WO | 02/088869 A2 | 11/2002 |
| WO | 02/091346 A1 | 11/2002 |
| WO | 02/101517 A1 | 12/2002 |
| WO | 02/103576 A1 | 12/2002 |
| WO | 03/021393 A2 | 3/2003 |
| WO | 03/029923 A2 | 4/2003 |
| WO | 03/029955 A1 | 4/2003 |
| WO | 03/030005 A1 | 4/2003 |
| WO | 03/030013 A1 | 4/2003 |
| WO | 03/030014 A1 | 4/2003 |
| WO | 03/058504 A1 | 7/2003 |
| WO | 03/069500 A1 | 8/2003 |
| WO | 03/071380 A2 | 8/2003 |
| WO | 03/071388 A2 | 8/2003 |
| WO | 03/073319 A1 | 9/2003 |
| WO | 03/077139 A1 | 9/2003 |
| WO | 03/085503 A1 | 10/2003 |
| WO | 03/085580 A1 | 10/2003 |
| WO | 04/001613 A1 | 12/2003 |
| WO | 2004/003684 A2 | 1/2004 |
| WO | 2004/003766 A1 | 1/2004 |
| WO | 2004/003885 A1 | 1/2004 |
| WO | 2004/046882 A2 | 6/2004 |
| WO | 2004/061815 A1 | 7/2004 |
| WO | 2004/086197 A2 | 10/2004 |
| WO | 2004/086198 A2 | 10/2004 |
| WO | 2004/095207 A2 | 11/2004 |
| WO | 2004/095208 A2 | 11/2004 |
| WO | 2004/114147 A1 | 12/2004 |
| WO | 2005/001627 A2 | 1/2005 |
| WO | 2005/003888 A2 | 1/2005 |
| WO | 2005/010645 A2 | 2/2005 |
| WO | 2005/117549 A2 | 12/2005 |
| WO | 2006/081536 A2 | 8/2006 |
| WO | 2007/033922 A2 | 3/2007 |
| WO | 2008/109441 A1 | 9/2008 |
| WO | 2009/097384 A1 | 8/2009 |

OTHER PUBLICATIONS

[No Author Listed] "How SmartForms for Fair Blaze Advisor works", Fair Issac White Paper, http://www.FAIRISAAC.COM/, Oct. 31, 2005.

[No Author Listed] Solaris 9 resource manager software. A technical white paper. Sun Microsystems, Inc., Palo Alto CA, 2002, 37 pages. XP-002291080. Retrieved Aug. 3, 2004 from <http://wwws.sun.com/software/whitepapers/solaris9/srm.pdf>.

Bertino and P. Foscoli, "Index Organizations for Object-Oriented Database Systems," IEEE Trans. on Knowledge and Data Engineering, 7(2):193-209 (1995).

Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.

Burleson, "Adding behaviors to relational databases," DBMS, 8(10): 68(5) (1995).

Busse, Ralph et al., "Declarative and Procedural Object Oriented Views", 1998, IEEE retrieved Mar. 22, 2007.

Buyya et al., "Economic Models for Resource Management and Scheduling in Grid Computing," 2002. Concurrency and Computation: Practice and Experience. vol. 14. pp. 1507-1542.

Chan and W. Hwang, "Towards Integrating Logic, Object, Frame, and Production," Proc. Fourth Int'l. Conf. on Software Engineering and Knowledge Engineering, pp. 463-469, Jun. 1992.

Cheng, Cheng-Chung; Smith, Stephen F.; "A Constraint Satisfaction Approach to Makespan Scheduling," AIPS 1996 Proceedings, pp. 45-52 (1996).

Cheng and Smith, "Applying Constraint Satisfaction Techniques to Job Shop Scheduling," 1997. Annals of Operations Research. 70: 327-357 (1997).

Cochrane, Roberta et al., "Integrating Triggers and Declarative Constraints in SQL", p. 567-578, Proceedings of the 22nd VLDB Conference Mumbai (Bombay), India, 1996, retrieved Mar. 22, 2007.

Damerau, F.J., Problems and some solutions in customization of natural language database front ends. ACM Transactions on Information Systems, vol. 3, No. 2, Apr. 1, 1985, pp. 165-184.

Danforth, "Integrating Object and Relational Technologies," Proc. Sixteenth Annual Int'l. Computer Software and Applications Conf., pp. 225-226, Sep. 1992 (abstract).

(56) References Cited

OTHER PUBLICATIONS

DeMichiel, et al., "Polyglot: Extensions to Relational Databases for Sharable Types and Functions in a Multi-Language Environment," Proc. Ninth Int'l. Conf. on Data Engineering, pp. 651-660, Apr. 1993.
Devarakonda et al., Predictability of process resource usage: A measurement-based study on UNIX. IEEE Transactions on Software Engineering. 1989;15(12):1579-1586.
Communication for European Patent Application No. 05755530.2, dated Sep. 6, 2007.
European Search Report for Application No. 05755530.2, dated Mar. 26, 2012 (3 Pages).
European Office Action issued Aug. 31, 2012 for Application No. 05755530.2 (4 Pages).
Communication for European Patent Application No. 07250844.3 enclosing European Search Report, dated Jul. 11, 2007.
Communication for European Patent Application No. 07250844.3, dated Mar. 28, 2008.
European Office Action issued Jul. 9, 2012 for Application No. 07250844.3 (8 Pages).
Communication for European Patent Application No. 07250848.4, dated Aug. 13, 2007 (EESR enclosed).
Communication for European Patent Application No. 07250848.4, dated May 29, 2008.
Communication for European Patent Application No. 08731127.0, dated Oct. 13, 2009.
Extended European Search Report issued Oct. 29, 2012 for Application No. 08731127.0 (8 Pages).
Francisco, S. et al. "Rule-Based Web Page Generation" Proceedings of the 2nd Workshop on Adaptive Hypertext and Hypermedia, Hypertext'98, Jun. 20-24, 1998.
International Search Report for PCT/US05/018599, dated May 15, 2007.
International Preliminary Report on Patentability for PCT/US2005/018599, dated Jun. 5, 2007.
International Search Report & Written Opinion for PCT/US06/03160, mailed Jul. 21, 2008.
International Preliminary Report on Patentability for PCT/US06/03160, dated Apr. 9, 2009.
International Search Report for PCT/US08/55503, mailed Jul. 28, 2008.
International Preliminary Report on Patentability for PCT/US2008/055503, mailed Sep. 17, 2009.
International Search Report & Written Opinion for PCT/US09/32341, mailed Mar. 11, 2009.
International Preliminary Report on Patentability for PCT/US2009/032341, mailed Aug. 12, 2010.
Jones et al., A user-centered approach to functions in excel. International Conference on Functional Programming, Uppsala, Jun. 30, 2003, pp. 1-12.
Johnson et al., Sharing and resuing rules—a feature comparison of five expert system shells. IEEE Expert, IEEE Services Center, New York, NY, vol. 9, No. 3, Jun. 1, 1994, pp. 3-17.
Kim, "Object-Oriented Databases: Definition and Research Directions," IEEE Trans. on Knowledge and Data Engineering, vol. 2(3) pp. 327-341, Sep. 1990.
Kuhn, H.W. "The Hungarian Method for the Assignment Problem," Naval Research Logistics Quarterly, 2 (1955), pp. 83-97.
Kuno and E.A. Rundensteiner, "Augmented Inherited Multi-Index Structure for Maintenance of Materialized Path Query Views," Proc. Sixth Int'l Workshop on Research Issues in Data Engineering, pp. 128-137, Feb. 1996.
Lippert, Eric, "Fabulous Adventures in Coding: Metaprogramming, Toast and the Future of Development Tools," Microsoft.com Blog, MSDN Home, published Mar. 4, 2004, 6 pgs.
Manghi, Paolo et. al. "Hybrid Applications Over XML: Integrating the Procedural and Declarative Approaches", 2002 ACM, pp. 1-6. Retrieved Mar. 22, 2007.
Markowitz and A. Shoshani, "Object Queries over Relational Databases: Language, Implementation, and Applications," IEEE Xplore, pp. 71-80, Apr. 1993.
Maryanski, et al., "The Data Model Compiler: A Tool for Generating Object-Oriented Database Systems," 1986 Int'l. Workshop on Object-Oriented Database Systems, 73-84 (1986).
McConnell, Steven C., "Brooks' Law Repealed," IEEE Software, pp. 6-9, Nov./Dec. 1999.
Mecca, G. et al. "Cut and Paste", ACM, pp. 1-25 and Appendix I-IV (1999). Retrieved Mar. 22, 2007.
Morizet-Mahoudeaux, "A Hierarchy of Network-Based Knowledge Systems," IEEE Trans. on Systems, Man, and Cybernetics, vol. 21(5), pp. 1184-1191, Sep. 1991.
Reinersten, Don, "Is It Always a Bad Idea to Add Resources to a Late Project?," Oct. 30, 2000. Electronic Design. vol. 48, Issue 22, p. 70.
Riccuiti, M., Oracle 8.0 on the way with objects: upgrade will also build in multidimensional engine. InfoWorld. Sep. 25, 1995;17(39):16.
Salvini and M.H. Williams, "Knowledge Management for Expert Systems," IEE Colloquium on 'Knowledge Engineering', 3 pages, May 1990.
Schiefelbein, Mark A Backbase Ajax Front-end for J2EE Applications, Internet Article, http://dev2dev.bea.com/1pt/a/433>, Aug. 29, 2005.
Sellis, et al., "Coupling Production Systems and Database Systems: A Homogeneous Approach," IEEE Trans. on Knowledge and Data Engineering, vol. 5(2), pp. 240-256, Apr. 1993.
Shyy and S.Y.W. Su, "Refinement Preservation for Rule Selection in Active Object-Oriented Database Systems," Proc. Fourth Int'l Workshop on Research Issues in Data Engineering, pp. 115-123, Feb. 1994.
Smedley, T.J. et al., "Expanding the Utility of Spreadsheets Through the Integration of Visual Programming and User Interface Objects," School of Computer Science, Technical University of Nova Scotia, ACM, 1996; pp. 148-155.
Stonebraker, "The Integration of Rule Systems and Database Systems," IEEE Trans. on Knowledge and Data Engineering, vol. 4(5), pp. 415-423, Oct. 1992.
Sun, et al., "Supporting Inheritance in Relational Database Systems," IEEE, pp. 511-518, Jun. 1992.
Thuraisingham, "From Rules to Frames and Frames to Rules," AI Expert, pp. 31-39, Oct. 1989.
Vranes, S. "Integrating Multiple Paradigms within the Blackboard Framework," IEEE Transactions on Software Engineering, vol. 21, No. 3, Mar. 1995, pp. 244-262.
Yang, Bibo; Geunes, Joseph; O'Brien, William J.; "Resource-Constrained Project Scheduling: Past Work and New Directions," Apr. 2001.
Gajos et al. SUPPLE: Automatically Generating User Interfaces. IUI 2004, 8 pages.

* cited by examiner

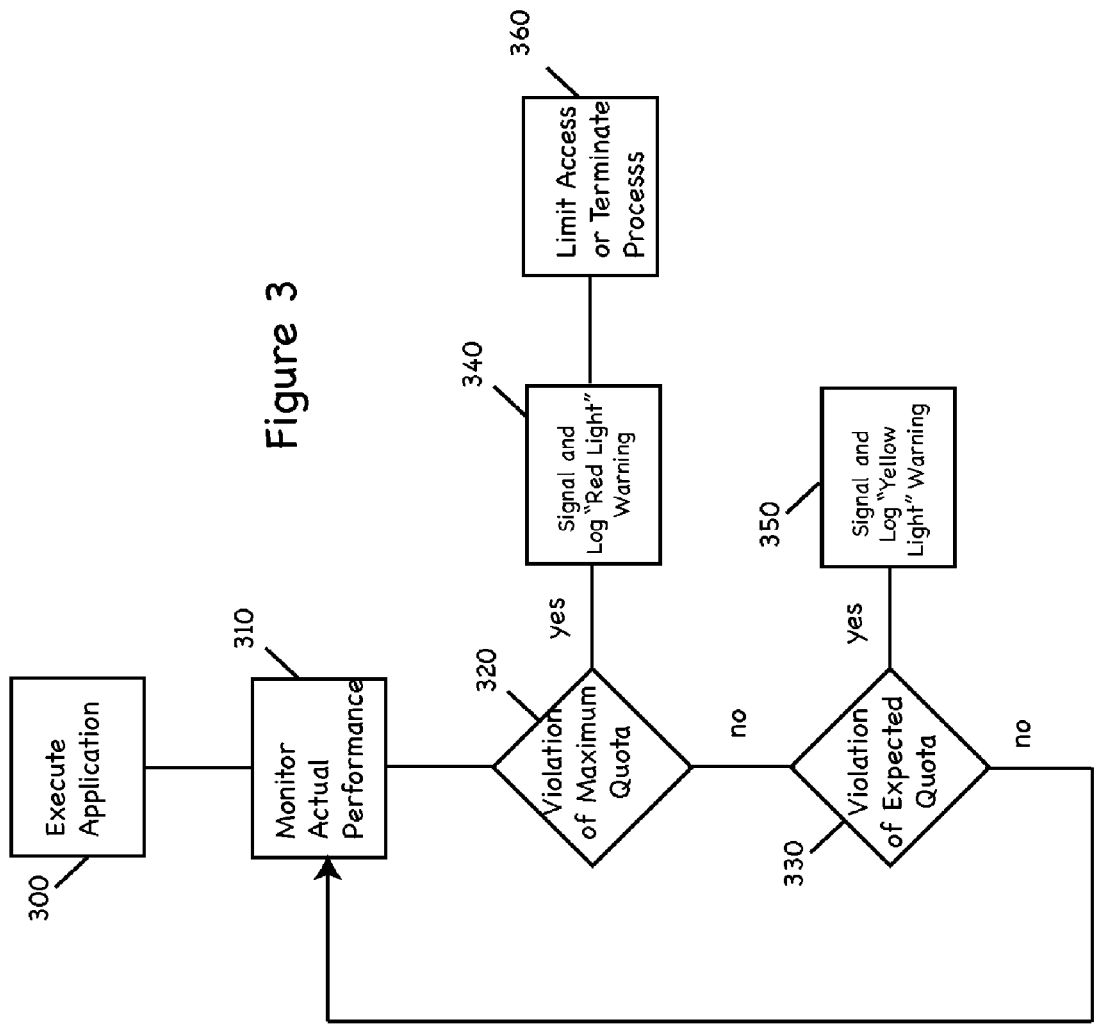

PROACTIVE PERFORMANCE MANAGEMENT FOR MULTI-USER ENTERPRISE SOFTWARE SYSTEMS

This application is a continuation application based on U.S. application Ser. No. 11/681,269 filed on Mar. 2, 2007, now U.S. Pat. No. 8,250,525 entitled "PROACTIVE PERFORMANCE MANAGEMENT FOR MULTI-USER ENTERPRISE SOFTWARE SYSTEMS." The teachings of the aforementioned application are incorporated herein by reference.

BACKGROUND OF THE INVENTION

The invention pertains to digital data processing and more particularly, by way of example, to proactively managing development and performance of digital data processing applications. The invention can be applied, by way of example, to the design and implementation of enterprise software systems.

Enterprise software systems routinely fail to process transactions quickly enough to satisfy business needs, especially as the number of users and intensity of processing increases. It has traditionally been difficult to "spec out" requirements for new software projects that would avoid these scalability and performance issues, since application development itself introduces much variability. In addition, original assumptions about the scalability of a system frequently turn out to be invalid. This is exacerbated by changing user requirements.

The end result is often that an application completed by a developer has performance and scaling characteristics that differ significantly from the customer's needs. In order to remedy this, the "completed" application can be sent back for further development—which starts a vicious cycle. Alternatively, it may be necessary to buy significantly more computer hardware to run the application and, thereby, create a conflict with the original budget.

A related problem exists after the application has moved into production. Unanticipated resource consumption by some users or system processes may result in the entire system or application becoming non—responsive.

It is a common expectation that enterprise software vendors provide performance guidelines that ensure a certain number of users can be supported on a given capacity platform. This approach offers a false sense of security, since, in reality, there is a great amount of variability in the application development process that invalidates the vendor's assumptions.

To accommodate this, customers can test the performance of applications at the end of the development process by simulating a large number of users and measuring application response. A drawback here is that, by the time a performance problem is discovered, remediation may involve significant expense, e.g., buying new hardware, sending the application back to development, redefining the specification for the project, and so forth.

It is possible to test the performance of the application concurrently with the development process. However, this requires a dedicated set of human and computer resources. It is also difficult to test the developmental application, except at certain milestones when it is stable. If the performance results are unsatisfactory, or significantly different from original assumptions, any attempts to remediate are likely to interfere with the development process and to throw development off-track.

Another approach is to perform a detailed analysis of a system's or application's behavior with a single user and then project how the system will behave as the number of users increases; see, United States Patent Publication No. 2005/0216235, entitled "Scalability Test and Analysis"). This approach suffers from the same limitations as above, e.g., it requires a completed application to measure and project performance.

In view of the foregoing, an object of this invention is to provide improved methods and apparatus for digital data processing.

A related object of the invention is to provide such methods and apparatus as facilitate the design of applications, e.g., for the enterprise.

Yet another object of the invention is to provide such methods and apparatus as facilitate the design of right-sized and appropriately scalable applications.

SUMMARY OF THE INVENTION

The foregoing are among the objects attained by the invention which provides, in some aspects, systems for proactive management of performance of a software application based on monitoring it (and/or one or more of its components) during the course of development. Those systems include a performance monitor that signals alerts upon determining that usage of the application (or its components) by users of like classes (or roles) may exceed quotas, when the application is placed in production mode.

Further aspects of the invention provide such systems in which the performance monitor signals the aforementioned alerts to software application developers and/or a centralized monitoring environment. This can be done proactively, e.g., without requiring active querying by the developers. The performance monitor can, moreover, log the alerts.

Yet further aspects of the invention provide systems as described above that include a model defining a relationship between users and resources estimated to be consumed by them during use of the application in production mode. Those resources can include processing capacity, memory capacity and/or network bandwidth of one or more digital data processors on which the application will execute.

Yet still further aspects of the invention provide such systems in which the model defines quotas for usage of the application in production mode and/or one or more components thereof by users in each of one or more classes. Related aspects provide such systems in which the model defines such quotas on the basis of individual and multiple users in such classes.

Still yet further aspects of the invention provide such systems in which the quotas include expected and/or maximum permitted usage of the application in production mode by users in each of one or more classes.

In other aspects, the invention provides systems paralleling those described above for monitoring applications executing in a production environment. Those systems signal alerts upon determining that usage of the application (or its components) by users of like classes (or roles) exceed quotas defined for those classes. Related aspects of the invention provide such systems as limit usage of the application by users if quotas for their respective classes are exceeded.

Further related aspects of the invention provide such systems that signal alerts upon determining that usage of the application (or its components) by users of like classes (or roles) are approaching quotas defined for those classes. Such systems can make those determinations by comparing actual usage of the application by users in each of one or more classes with expected usage for those respective classes.

Still yet further aspects of the invention provide such systems that include sending the alerts generated during application production mode (i.e., run-time mode) to developers and/or a centralized monitoring environment. Further related aspects of the invention include systems which log the alerts generated during application production mode.

In other aspects, the invention provides such systems that utilize performance histories in defining the aforementioned model and/or its constituent quotas.

Other aspects of the invention provide systems as described above that utilize like models during monitoring the application (and/or one or more of its components) during both development and production mode. Related aspects of the invention provide such systems that utilize differing models during those respective modes.

Still yet other aspects of the invention provide systems as described above in which the aforesaid model and/or monitoring of the application are also effected by a rules base executed on such an engine.

In yet still other aspects, the invention provides methods for proactive management of performance of software applications paralleling the operations of the systems described above. Such methods can include responding to signaling, e.g., during application development, that usage of the application (or its components) by users of like classes may exceed quotas by altering (i) implementation of the application, (ii) allocation of time for such implementation, (iii) quotas defined for the respective classes, (iv) allocation of resources to the application, and/or (v) definition of the relationships defined in the model. In related aspects of the invention, personnel responsible for development, management and/or procurement of the application can respond to such signaling by communicating with one another in regard to potential implementation of one or more such alterations. Further related aspects of the invention include modifying the model to reflect such alterations.

These and other aspects of the invention are evident in the drawings and in the description that follows.

DETAILED DESCRIPTION OF THE ILLUSTRATED EMBODIMENT

A more complete understanding of the invention may be attained by reference to the drawings, in which:

FIG. 3 depicts a flow diagram illustrating a production mode operation of a digital data processing system according to one practice of the invention.

ARCHITECTURE

Figure 1:
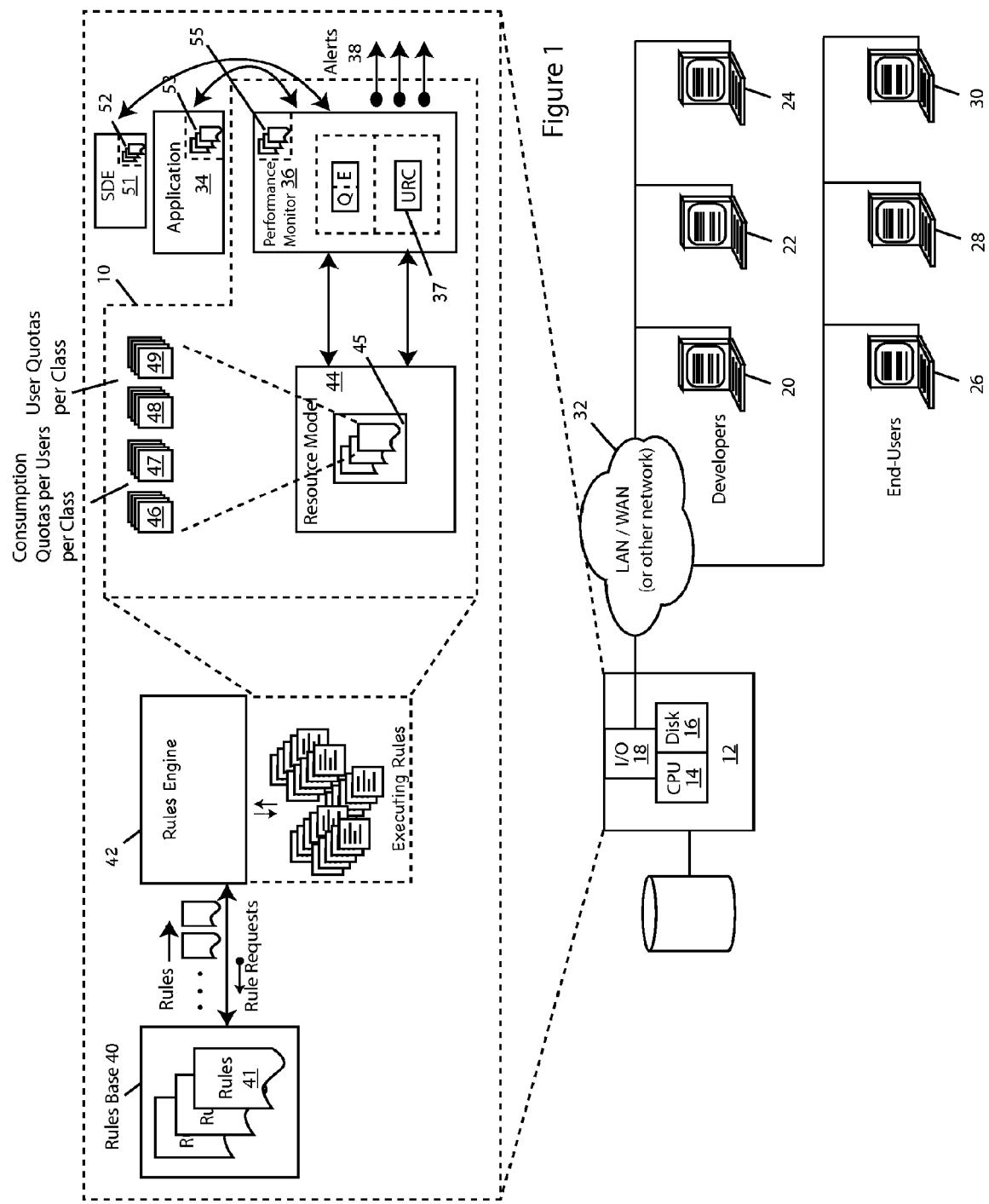
FIG. 1 depicts a digital data processing system and environment according to one practice of the invention.

FIG. 1 depicts a system 10 and environment for proactively managing performance of a software application 34, particularly, for example, a multi-user enterprise application, according to one practice of the invention. In the illustrated embodiment, system 10 executes on exemplary digital data processor 12, which may be a personal computer, workstation, mainframe, or other digital data processing apparatus of the type known in the art capable of executing applications, programs and/or processes.

Illustrated digital data processor 12 executes in a network environment of the type typical in a business enterprise, e.g., one including further digital data processors 20-30—which themselves may comprise personal computers, workstations, mainframes, or other digital data processing apparatus. In other embodiments, digital data processor 12 may operate alone or in other environments, networked or otherwise. In any event, illustrated digital data processors 20-30 are coupled to digital data processor 12 via a network 32, such as the Internet, a local-area network (LAN), wide-area network (WAN), or otherwise, that may be public, private, IP-based, etc.

In a typical embodiment, illustrated here, data processors 20-24 are used in development mode, e.g., by software engineers, test engineers, systems administrators, etc. (collectively, "developers") to develop, test and maintain/or software application 34. Likewise, data processors 26-30 are employed by users to execute instantiations of the application 34. In the discussion that follows, digital data processor 12 assumes both roles for sake of simplicity of discussion—i.e., it is treated as if used by developers to develop, test and maintain the application, as well as by users to execute the application. Moreover, it is also assumed for sake of simplicity of discussion that application 34 executes on a single digital data processor; however, in practice, the application 34 may execute on or over multiple digital data processors (e.g., in client-server mode, peer-to-peer mode, etc.).

Illustrated digital data processor 12 includes rules base 40 constructed and accessed in the conventional manner known in the art of rules bases. The digitally encoded rules 41 that it contains are likewise formatted and stored in the conventional manner known in the art. An example of the structure, operation and use of the rules base 40 and rules 41 is provided in commonly assigned U.S. Pat. No. 5,826,250, entitled "Rules Bases and Methods of Access Thereof" and U.S. patent application Ser. No. 11/368,360, filed Mar. 3, 2006, entitled "Rules Base Systems and Methods with Circumstance Translation," the teachings of both of which are incorporated herein by reference.

Illustrated digital data processor 12 also includes rules engine 42 of the type conventionally known in the art for use in processing rules, e.g., retrieved from a rules base 40, in order to respond to (or otherwise handle) events signaled to and/or detected by the engine 42.

Illustrated digital data processor 12 further includes a software development environment (SDE) 51 that facilitates development of rules-based (or other) applications, e.g., application 34. This may include a text editor, an interpreter/compiler, libraries, or otherwise—all of the type known in the art—as adapted in accord with the teachings hereof. The SDE 51 may, itself, be comprised of rules 52 that execute on engine 42, or otherwise.

With continued reference to FIG. 1, system 10 includes a resource model (or simply "model") 44 and a performance monitor 36. Resource model 44, which in the illustrated embodiment executes on rules engine 42, comprises a set of rules 45 which, by way of non-limiting example, defines and models relationships between users (given their respective roles, as described herein) and resources estimated to be consumed by them (as well, optionally, as those actually consumed by them) during use of the application 34 in production mode.

Though, in the illustrated embodiment, model 44 comprises rules 45 that are executed on engine 42, in other embodiments the model 44 may be defined and/or executed otherwise. In instances, such as the illustrated embodiment, where the model 44 is defined by rules 45, those rules can provide functionality attributed to the model below (and elsewhere herein), though, in other embodiments, that functionality can be incorporated in other elements of the system (e.g., the performance monitor 36). Consistent with the remarks above, though model 44 is shown as executing on digital data processor 12, it will be appreciated that, like application 34, it may execute on or over multiple digital data processors.

Performance monitor 36, also executing on rules engine 42, comprises a set of rules 55, which are in communications coupling with the application 34 (e.g., via RPC or otherwise) and which monitor the application in order to, inter alia, (i) signal alerts if predicted (or actual) usage of the application or its components by users of like classes may (or does) exceed quotas, and/or (ii) limit usage of the application or its components by users if quotas for their respective classes are approached, met or exceeded. In the illustrated embodiment, such monitoring is performed in real-time and persistently, so as to afford developers, users and others (e.g., system administrators) proactive and immediate feedback regarding expected or actual application performance. In other embodiments, such proactive and up-to-date feedback is achieved by monitoring the application after-the-fact, e.g., following each compilation, build and/or run of the application 34, at the end of each work day, etcetera.

As used herein, the phrase "monitoring the application" refers to monitoring not only the application 24 in development and/or production modes, but also monitoring resources (e.g., processor capacity, network bandwidth, disk storage, etc.) impacted by the application. In this manner, the performance monitor 36 helps insure that performance of the application will meet or exceed expectations/specifications.

As above, in the illustrated embodiment, performance monitor 36 is defined by rules 55 that are executed on engine 42, though, in other embodiments the monitor 36 may be defined and/or executed otherwise. Moreover, though performance monitor 36 is shown as executing on digital data processor 12, it will be appreciated that, like application 34, it may execute on or over multiple digital data processors.

Illustrated application 34, also executing on the rules engine 42, comprises a set of rules 53 defining one or more software applications written, tested and revised by developers and executed by users. By way of non-limiting example, such a software application 34 can be a multi-user enterprise software system (e.g., business process management application), and the like. Moreover, the application 34 can comprise one or more components, modules, systems, and so forth (collectively, "components"), as is common in the art. Though, in the illustrated embodiment, application 34 is defined by rules 53 that are executed on engine 42, in other embodiments the application 34 may be defined and/or executed otherwise.

As used herein, activity by developers with respect to an application (e.g., in writing, testing and revising the application) is referred to as "development mode." Activity by users (e.g., in running the application) is referred to as "production mode." Although, in the typical application, development mode precedes production mode in the application life cycle, the term development mode can include subsequent activity—as where developers revise an application to fix "bugs," add new functionality, etc.

Resource Model

As noted, resource model 44 models a relationship between users (given their respective roles) and their estimated (and, optionally, actual) consumption of resources in connection with application 34. It is used with the performance monitor 36 to gauge expected or actual resource consumption during development and production modes of the application 34—and, specifically, to insure that consumption falls within defined quotas—and, thereby to insure adequate performance.

To this end, illustrated model 44 defines user roles or classes for anticipated (or actual) application users. These can include, for example, general classes, like "power user" and "limited user," and/or specific classes, like "sales executive," "phone operator," and so forth. The model can, further, assign actual or expected users to specific ones of these classes. The model 44 may be supplemented or supplanted in each of these functions by other elements of the system 10, digital data processor 12, or otherwise. Thus, for example, the model can define user roles/classes and assign specific users to those classes based on look-up tables contained elsewhere on the digital data processor (e.g., operating system user tables).

Illustrated model 44 further defines, on the basis of user roles, consumption quotas 46, 47 for use of resources by application 34. Those resources can include, by way of example, processor, memory, input/output, communications, network or other resources of the digital data processor 12 and/or network (or other) environment on which the application 34 operates. In the illustrated embodiment, the quotas 46, 47 can include both maximum and expected figures. More particularly, for example, the quotas 46, 47 can include, for each of at least selected resources, (1) maximum system resource consumption 46 for a user (or users) in a given role/class, and/or (2) expected system resource consumption 47 for a user (or users) in a given role/class.

As an example, maximum resource consumption quotas 46 can indicate that (i) an individual user of the limited class is permitted to consume no more than 0.2 percent of the processor capacity, peak, and (ii) 200 kbytes/sec on the network, peak, during use of the application. Alternatively, or in addition, maximum quotas 46 can indicate that (i) all simultaneous users of the limited class are permitted to consume no more than 15 percent of processor capacity, peak, and (ii) 3 Mbytes/sec on the network, peak, during use of the application.

Similarly, by way of example, expected resource consumption quotas 47 can indicate that (i) an individual user of the limited class is permitted to consume no more than 0.1 percent of processor capacity, on average, and (ii) 10 kbytes/sec on the network, on average, during use of the application. Alternatively, or in addition, quotas 46 can indicate that (i) all simultaneous users of the limited class are permitted to consume 5 percent of processor capacity, on average, and (ii) 1 Mbytes/sec on the network, on average, during use of the application.

Typically, the expected system resource consumption quota 47 is lower than quota 46, and is utilized to alert developers, system administrators, etc., that an execution or interaction by a given user or developer is approaching the respective user role's maximum allowed resource consumption quota 47. This two-tier quota system is used in the illustrated embodiment, for example, to give developers advanced warning of possible performance deterioration, thereby giving them ample opportunity to address the problem (e.g., changing the implementation). Though only two quotas per resource—maximum 46 and expected 47—are discussed here, in alternative embodiments, a lesser or greater number of quotas may be employed.

The model further defines quotas 48, 49 for the numbers of users of each class that are simultaneously permitted to use the application itself and/or its components (collectively, "application," unless indicated otherwise). As above, two quotas are provided in the illustrated embodiment: a maximum number 48 of users per respective class, and an expected number 49 of users per expected class. Those skilled in the art will appreciate the such quotas may be alternatively defined, e.g., the model might define that application 34 can be used by 500 simultaneous users, 20 of who can be power users. As above, though only two quotas per class—maximum 48 and expected 49—are discussed here, in alternative embodiments, a lesser or greater number of quotas may be employed Still further, the model 44 models (e.g., predicts) how use of the application 34 and its components by users, e.g., of given classes, relates to resource consumption. In this regard, a simple model 44 might define the following "user consumption relationships":

- each user (regardless of class) executing the application consumes 0.1 percent of the processor capacity and transmits 10 kbytes/sec on the network
- execution of subsystem X of the application by a user of the "limited" class additionally consumes 0.3 percent of the processor capacity and transmits 30 kbytes/sec on the network
- execution of subsystem X of the application by user of the "power" class additionally consumes 0.5 percent of the processor capacity and transmits 40 kbytes/sec on the network
- execution of subsystem Y of the application by a user of the "limited" class additionally consumes 0.35 percent of the processor capacity and transmits 100 kbytes/sec on the network
- execution of subsystem Y of the application by user of the "power" class additionally consumes 0.6 percent of the processor capacity and transmits 150 kbytes/sec on the network.

In view of the foregoing, it will be appreciated that the model can predict—given specifics of the application 34 (e.g., number of remote calls made, disk usage, memory requirements, etc.)—whether the resource consumption quotas (and, therefore, expected performance) will be exceeded when the application is executed by, individual, expected and/or maximum numbers of users in each class. During development mode of the application 34, the performance monitor 46 can make use of this to gather application specifics, apply them to the model 44 and report quota violations to the developer, e.g., by the alert mechanism discussed below.

During production mode, the predicative capabilities of the model 44 need not be used (though, they may be, in some embodiments). Rather, in that mode, the performance monitor 46 can gather actual statistics about resource consumption and compare them against quotas maintained in the model, again, reporting, violations to the developer, system administrator, etc.—or, limiting execution of the application to specific numbers/types of users.

In the illustrated embodiment, the quotas 46-49 form part of the rules base 45 defined by the developer, his/her project manager and/or other persons involved in defining the requirements for application 34 (collectively, the "project manager"). To facilitate this, particularly in regard to development work on new versions and/or modifications of application 34, the model 44 can utilize and/or incorporate performance histories that are, for example, gathered by the performance monitor 36 during production mode (e.g., in connection with the alerts discussed below) and/or collected from logs on the digital data processor 12, networking system, or otherwise. This can be achieved, for example, by execution of rules in the rules base 45 that periodically, on demand, or otherwise, identify those logs and extract relevant records for storage, e.g., in the model, and display or permit query by the project manager when new quotas are being defined. In preferred embodiments, the model utilizes the historical performance information to update the rules 45 that reflect "user consumption relationships."

Operation

Figure 2:
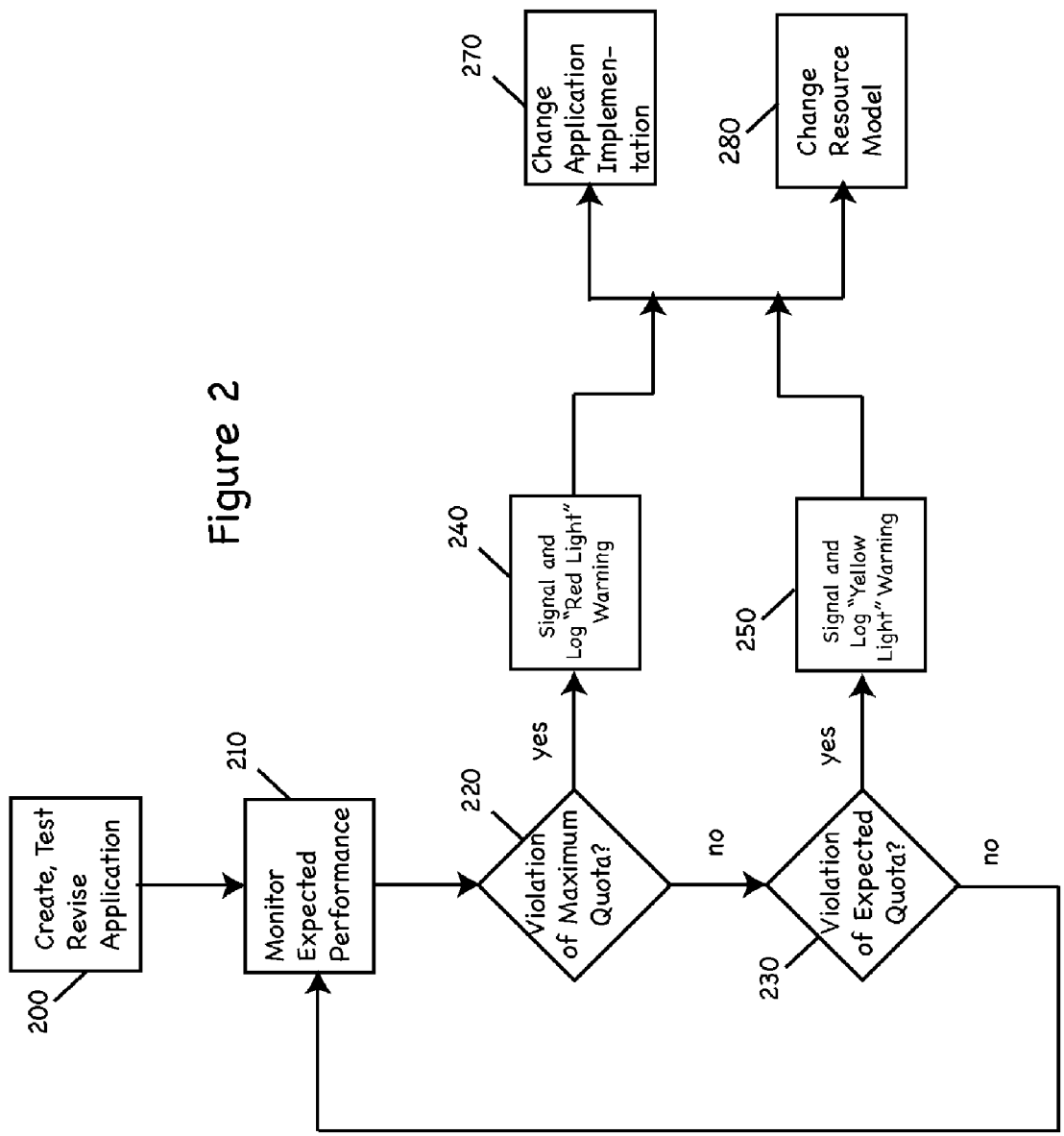
FIG. 2 depicts a flow diagram illustrating a development mode operation of a digital data processing system according to one practice of the invention.

FIG. 2 is a flow diagram depicting the operation of system 10 in development mode. In step 200, developers create, test and/or revise software application 34 in the conventional manner, e.g., using SDE 51. In the illustrated embodiment, rules engine 42 executes rules 53 defining the application 34, and developers modify those rules 53 (or add new rules) within the SDE 51 (e.g., via a text editor or other component of the SDE 51) in order, for example, to alter the functionality and/or performance characteristics of application 34.

In step 210, the performance monitor 36 monitors the SDE 51, e.g., in real-time (for example, while the developer enters lines of code, issue commands for validation and/or compilation of modules, and/or save modules to disk or a software repository) or responds to direct invocation by the developers, to test the application-in-development against the model 44 to ensure that performance will meet or exceed expectations/specifications when it is deployed (i.e., enters production mode).

To this end, the performance monitor 36 obtains from the SDE 51 specifics of the application 34 (e.g., as noted above, number of remote calls made, disk usage, memory requirements, etc.) and applies them to the model by way of function calls or otherwise. The model 44 and, more particularly, the rules 45 that represent it, execute on the rules engine 30 and determine whether the resource consumption quotas will be exceeded (and, therefore, expected performance not achieved), given the specifics provided.

As reflected in steps 220-280, the model 44 can report quota violations to the SDE 51 which, in turn, can alert the developer. In other embodiments, the model 44 generates results directly to the developer. Regardless, the reported quota violations can include identification of quota violated, measure of expected violations, etc., and, thereby, facilitate correction of the application by the developer and/or modification of quotas by the project manager, as reflected in steps 270, 280.

Alternatively, or additionally, the developer and/or product manager can respond to such alerts by (i) allocating additional time for implementation of the application (or fixes thereto), (ii) allocating additional resources to the application, and/or (iii) refining the "user consumption relationships" defined by the model. Additionally, such alerts can motivate personnel responsible for development, management and/or procurement of the application to communicate in regard to potential implementation and/or alteration of the application, the model, or otherwise.

As illustrated in steps 220, 240, when the model detects violation of a maximum resource quota 46, the performance monitor 36 signals the developer with a high-priority alert or warning (e.g., a "red light" warning). This can take the form of, for example, a pop-up window on a developer's screen/terminal 20-24, an email to a developer, and so forth. Alternatively, as illustrated in steps 230, 250, when the model detects violation of an expected resource quota 47, the performance monitor 36 signals the developer with a low-priority alert or warning (e.g., a "yellow light" warning). Again, this can take the form of, for example, a pop-up window on a developer's screen/terminal 20-24, an email to a developer, and so forth. In the illustrated embodiment, alert categories (e.g., high-priority, low-priority, etc.) are associated with the alerts to reflect the importance of the anticipated quota violation; in other embodiments additional and/or other categories may be used. Likewise, alerts may be signaled by other and/or additional mechanisms to those mentioned above.

In preferred embodiments, alerts are sent to are signals not only to developers but also to a log and/or a centralized monitoring environment, e.g., a database maintained by project manager(s) or other personnel responsible for development of application 34. This facilitates identifying and categorizing alerts, e.g., to improve overall developer and application performance.

Operation of system 10 in production mode (i.e., run-time execution of application 34) parallels that of operation during development mode. Generally, the rules engine 42, resource model 44, and performance monitor 36 operate in the manner described above, e.g., in connection with FIG. 2. In production mode, however, application 34 has "gone live," and the predictive capabilities of the model 44 need not be used. Rather, the performance monitor 36 monitors actual use of the application 34 and resource consumed by it. Thus, the "specifics" applied to the model 44 by the monitor 36 in production mode are actual statistics about resource consumption by actual users.

FIG. 3 is a flow diagram illustrating operation of system 10 during production mode. Steps 300-350 parallel steps 200-250 in FIG. 2. For example, in step 340 and 350, the monitor 36 sends "red light" and/or "yellow light" alert(s) 38 to developers, project managers, systems administrators, or other personnel (and, where appropriate, to end-users) depending on whether actual usage violates a maximum quota 46, 48 or an expected quota 47, 49. Note, that the violations in production mode can (unlike development mode) include violations of the expected and maximum user quotas 48, 49. As above, the alerts 38 can also be logged to the centralized monitoring environment. Also as noted, the resource model 44 (or performance monitor 36, etc.) may utilize performance histories to facilitate entry of quotas and definition of rules defining "user consumption relationships." To this end, the alerts can be logged for access by the model 44 and/or they can effect logging of detailed performance statistics which may also be accessed by the model.

In production mode, unlike development mode, the monitor 36 can limit usage of the application 34 by one or more users upon determining that usage (individual or collective) violates one or more quotas (typically, maximum consumption quotas 46). This can be effected, e.g., when a red light warning condition has been signaled, by preventing additional users from executing the application and/or by terminating the processes of one or more offending users. See step 360.

Described herein are methods and systems meeting the objects set forth above, among others. It will be appreciated that the illustrated embodiment and those otherwise discussed herein are merely examples of the invention and that other embodiments, incorporating changes thereto, fall within the scope of the invention.

In view of the foregoing, what is claimed is:

1. A system for proactive management of performance of an application, the system comprising:
    a digital data processor configured to execute a performance monitor in communications coupling with one or more resources, and
    the performance monitor configured to:
        monitor (i) usage of the application by a user and/or one or more components thereof by the user, and (ii) consumption of the one or more resources during the usage of the application and/or the one or more components thereof by the user, wherein the resources include any of processing capacity, memory capacity, and/or network bandwidth, and
        signal an alert upon determining that such usage by the user and/or consumption of resources during such usage violates a model, wherein the model defines one or more quotas for the user with respect to usage of a component of the application by the user, wherein the one or more quotas defined by the model include a maximum resource consumption quota and an expected resource consumption quota, wherein the model indicates that the user is permitted to consume no more than a pre-determined amount of processor capacity and no more than a pre-determined amount of network bandwidth, and wherein the expected resource consumption quota is between 0.1-0.35 percent of processor capacity to be consumed by the user on average, and between 10-100 kilobytes per second on the network to be consumed by the user on average, during use of the application.

2. The system of claim 1, wherein the performance monitor limits usage and/or consumption of resources.

3. The system of claim 1, wherein the model further defines the one or more quotas in accord with a class to which the user belongs.

4. The system of claim 3, wherein the quotas include any of (i) maximum permitted usage of the application by users in each of one or more classes, and (ii) expected usage of the application by users in each of one or more classes.

5. The system of claim 3, wherein the model defines such quotas on the basis of individual and multiple users in such classes.

6. A method for proactive management of performance of an application, the method comprising:
    monitoring, by a digital data processor, (i) usage of the application by a user and/or one or more components thereof by the user, and (ii) consumption of the one or more resources during usage of the application and/or one or more components thereof by the user, wherein the resources include any of processing capacity, memory capacity, and/or network bandwidth, and
    signaling an alert upon determining that such usage by the user and/or consumption of resources during such usage violates a model, wherein the model defines one or more quotas for the user with respect to usage of a component of the application by the user, wherein the one or more quotas defined by the model include a maximum resource consumption quota and an expected resource consumption quota, wherein the model indicates that the user is permitted to consume no more than a pre-determined amount of processor capacity and no more than a pre-determined amount of network bandwidth, and wherein the expected resource consumption quota is between 0.1-0.35 percent of processor capacity to be consumed by the user on average, and between 10-100 kilobytes per second on the network to be consumed by the user on average, during use of the application.

7. The method of claim 6, further comprising limiting usage and/or consumption of resources by any of:
    (i) preventing additional users from executing the application, and
    (ii) terminating a process of the user.

8. The method of claim 6, wherein the alert is signaled to a centralized monitoring environment.

9. The method of claim 6, wherein the model is defined based on a performance history of the application.

10. The method of claim 6,
    wherein the model is defined using one or more business rules, and
    wherein the business rules describe one or more relationships between the user and the one or more resources during the usage of the application and/or the one or more components thereof.

11. A system for proactive management of performance of an application, the system comprising:
a digital data processor configured to execute a performance monitor in communications coupling with one or more resources, and
the performance monitor configured to:
monitor (i) usage of the application by a user and/or one or more components thereof by the user, and (ii) consumption of the one or more resources during the usage of the application and/or the one or more components thereof by the user, wherein the resources include any of processing capacity, memory capacity, and/or network bandwidth, and
signal an alert upon determining that such usage by the user and/or consumption of resources during such usage violates a model, wherein the model defines one or more quotas for the user with respect to usage of a component of the application by the user, wherein the one or more quotas defined by the model include a maximum resource consumption quota and an expected resource consumption quota, wherein the model indicates that the user is permitted to consume no more than a pre-determined amount of processor capacity and no more than a pre-determined amount of network bandwidth, and wherein the maximum resource consumption quota is between 0.1-0.6 percent peak of the processor capacity to be consumed by the user, and between 10-200 kilobytes per second peak on the network to be consumed by the user during use of the application.

12. The system of claim 11, wherein the performance monitor limits usage and/or consumption of resources by any of:
(i) preventing additional users from executing the application, and
(ii) terminating a process of the user.

13. The system of claim 11, wherein the performance monitor signals the alert to a centralized monitoring environment.

14. The system of claim 11, wherein the model is defined based on a performance history of the application.

15. The system of claim 11,
wherein the model is defined using one or more business rules executing on a rules engine in communications coupling with the performance monitor and with the digital data processor, and
wherein the business rules are configured to describe one or more relationships between the user and the one or more resources during the usage of the application and/or the one or more components thereof.

16. A method for proactive management of performance of an application, the method comprising:
monitoring, by a digital data processor, (i) usage of the application by a user and/or one or more components thereof by the user, and (ii) consumption of the one or more resources during usage of the application and/or one or more components thereof by the user, wherein the resources include any of processing capacity, memory capacity, and/or network bandwidth, and
signaling an alert upon determining that such usage by the user and/or consumption of resources during such usage violates a model, wherein the model defines one or more quotas for the user with respect to usage of a component of the application by the user, wherein the one or more quotas defined by the model include a maximum resource consumption quota and an expected resource consumption quota, wherein the model indicates that the user is permitted to consume no more than a pre-determined amount of processor capacity and no more than a pre-determined amount of network bandwidth, and wherein the maximum resource consumption quota is between 0.1-0.6 percent peak of the processor capacity to be consumed by the user, and between 10-200 kilobytes per second peak on the network to be consumed by the user during use of the application.

17. The method of claim 16, further comprising limiting usage and/or consumption of resources.

18. The method of claim 16, wherein the model further defines the one or more quotas in accord with a class to which the user belongs.

19. The method of claim 16, wherein the quotas include any of (i) maximum permitted usage of the application by users in each of one or more classes, and (ii) expected usage of the application by users in each of one or more classes.

20. The method of claim 16, wherein the model defines such quotas on the basis of individual and multiple users in such classes.

* * * * *